US012658493B2

(12) United States Patent
Guan

(10) Patent No.: US 12,658,493 B2
(45) Date of Patent: Jun. 16, 2026

(54) ENERGY STORAGE MODULE FOR BATTERY RACK COMPRISNG PHASE CHANGE MATERIAL HEAT EXCHANGER

(71) Applicant: WÄRTSILÄ ENERGY STORAGE, INC., Herndon, VA (US)

(72) Inventor: Dewei Guan, Houston, TX (US)

(73) Assignee: WÜRTSILÄ ENERGY STORAGE, INC., Herndon, VA (US)

( * ) Notice: Subject to any disclaimer, the term of this patent is extended or adjusted under 35 U.S.C. 154(b) by 236 days.

(21) Appl. No.: 18/561,429

(22) PCT Filed: May 18, 2021

(86) PCT No.: PCT/US2021/032869
§ 371 (c)(1),
(2) Date: Nov. 16, 2023

(87) PCT Pub. No.: WO2022/245336
PCT Pub. Date: Nov. 24, 2022

(65) Prior Publication Data
US 2024/0250330 A1     Jul. 25, 2024

(51) Int. Cl.
H01M 10/613          (2014.01)
H01M 10/615          (2014.01)
(Continued)

(52) U.S. Cl.
CPC ....... H01M 10/613 (2015.04); H01M 10/615 (2015.04); H01M 10/633 (2015.04);
(Continued)

(58) Field of Classification Search
CPC ............. H01M 10/613; H01M 10/627; H01M 10/633; H01M 10/653; H01M 10/6556; H01M 50/204; H05K 7/20263
See application file for complete search history.

(56) References Cited

U.S. PATENT DOCUMENTS

| | | | |
|---|---|---|---|
| 9,105,951 | B2 | 8/2015 | Anderson-Straley et al. |
| 2005/0167169 | A1 | 8/2005 | Gering et al. |

(Continued)

FOREIGN PATENT DOCUMENTS

| | | | |
|---|---|---|---|
| CN | 108199121 A | 6/2018 | |
| CN | 106143186 B | * 2/2019 | ................ H02J 7/00 |

OTHER PUBLICATIONS

CN108199121 Shanghai; Machine Translation (Year: 2018).*

(Continued)

*Primary Examiner* — Travis Ruby
(74) *Attorney, Agent, or Firm* — Ziegler IP Law Group, LLC.

(57) ABSTRACT

An energy storage cooling system for an energy storage module has a chiller for supplying a coolant; a PCM heat sink including a heat exchanger; a piping system for circulating the coolant between the chiller, the heat exchanger and a battery rack of the energy storage module; a valve system including at least one 3-way valve arranged upstream to the PCM heat sink and to the battery rack; a control unit configured to control the 3-way valves in different operating modes including at least following modes: Battery cooling mode, wherein the coolant is allowed to circulate through PCM heat sink and through the battery rack; and battery heating mode, wherein the coolant is not allowed to circulate through PCM heat sink but allowed through the battery rack.

21 Claims, 11 Drawing Sheets

(51) Int. Cl.
    *H01M 10/633*     (2014.01)
    *H01M 10/653*     (2014.01)
    *H01M 10/6556*     (2014.01)
    *H01M 50/204*     (2021.01)

(52) U.S. Cl.
    CPC ..... *H01M 10/653* (2015.04); *H01M 10/6556*
    (2015.04); *H01M 50/204* (2021.01)

(56)         References Cited

U.S. PATENT DOCUMENTS

| | | | | |
|---|---|---|---|---|
| 2012/0327596 | A1* | 12/2012 | Anderson-Straley | ....................... H01M 10/625 361/689 |
| 2014/0158340 | A1* | 6/2014 | Dixler | ................. H01M 10/613 165/287 |
| 2015/0189791 | A1* | 7/2015 | Tamura | ................... B23P 15/26 29/890.035 |
| 2017/0077565 | A1* | 3/2017 | Burrows | ............. H01M 10/613 |
| 2017/0120725 | A1 | 5/2017 | Zhou et al. | |
| 2017/0181325 | A1* | 6/2017 | Shelnutt | ............. H05K 7/20272 |
| 2017/0311480 | A1* | 10/2017 | Suzuki | ...................... F28F 3/08 |
| 2019/0104646 | A1* | 4/2019 | So | ...................... H05K 7/20772 |
| 2020/0152930 | A1* | 5/2020 | Singer | ................. H01M 10/653 |
| 2020/0161728 | A1* | 5/2020 | Wang | ............... H01M 10/6554 |
| 2021/0045265 | A1 | 2/2021 | Sun et al. | |
| 2023/0178822 | A1* | 6/2023 | Park | .................. H01M 10/6556 429/90 |

OTHER PUBLICATIONS

Cheng CN106143186B Machine Translation (Year: 2019).*

Untied States Patent and Trademark Office, The International Search Report and the Written Opinion of the International Searching Authority, or the Declaration, Application No. PCT/US21/32869, Mailed Sep. 10, 2021, 11 Pages.

* cited by examiner

540

ENERGY STORAGE MODULE FOR BATTERY RACK COMPRISNG PHASE CHANGE MATERIAL HEAT EXCHANGER

TECHNICAL FIELD

The present application generally relates to an apparatus, a device, a method and software code for controlling cooling of an energy storage module or an energy storage system. The present application further relates to a method, an apparatus and software code for integrating an energy storage module to a power plant system that includes a renewable energy source.

BRIEF DESCRIPTION OF RELATED DEVELOPMENTS

This section illustrates useful background information without admission of any technique described herein representative of the state of the art.

Modem energy storage systems are fundamentally changing the way the customers approach energy storage. Desired systems should accelerate deployment, reduce costs and risk associated with installing energy storage. A distributed energy storage platform may be bundled with the advanced software controls to optimize savings, aggregate distributed energy resources, fortify grid resiliency and reliability and integrate renewables, for example.

Delivery of stable power with unsurpassed performance and profitability with system modularity and intelligent control and data management increase the challenges even further.

One traditional approach for managing storage assets is to deploy a plant controller that interacts with the batteries and a power control system (PCS) layered on top of the battery management system (BMS). Known systems may also utilize a software-based controller.

Improved solutions are desired for some of the most critical challenges facing utilities: easing demands on aging infrastructure, adapting to a higher penetration of renewables, and improving grid reliability.

Energy storage modules are increasingly used in mobile and stationary applications. Uses include hybrid vehicles, full electric vehicles, as well as stationary power generation, such as power plants. The modules usually contain battery or ultracapacitor cells as a way of storing electrical energy for periods of time, and/or rapidly charging or discharging when needed. The charge/discharge process quickly generates a large amount of heat, which should be managed. Also, the performance and life of the cells depends upon their temperature. Therefore, a steady state temperature of the cells should be managed in smart controlled way.

Excess heat or a manufacturing defect can lead to high levels of heat in a cell which can then cause the destruction of the cell, known as thermal runaway. Destruction of a cell can also cause heat damage to adjacent cells which can in turn cause destruction of one or more of the adjacent cells. This is known as cell propagation. Effective thermal management of the energy storage module can prevent thermal runaway and cell propagation.

A known technique for cooling energy storage modules includes circulating coolant between the energy storage cells. Coolant passages are typically incorporated into the energy storage module such that heat within the storage cells is transferred to the circulating coolant. Coolant is circulated by a pump through the energy storage module and then through a radiator or other type of heat exchanger. Coolant must be circulated whenever a predetermined portion of the energy storage module reaches a maximum allowed temperature.

Thus, an easy to set-up, accurate, and highly functional and reliable solution is needed to provide improved power plant or energy storage system with controlled cooling.

SUMMARY

According to a first example aspect of the disclosed embodiments there is provided an energy storage cooling system for an energy storage module, comprising:

a chiller for supplying a coolant;

a PCM heat sink comprising a heat exchanger;

a piping system for circulating the coolant between the chiller, the heat exchanger and a battery rack of the energy storage module;

a valve system comprising at least one 3-way valve arranged upstream to the PCM heat sink and to the battery rack;

a control unit configured to control the valve system in different operating modes comprising at least following modes:

battery cooling mode, wherein the coolant is allowed to circulate through the PCM heat sink and through the battery rack; and battery heating mode, wherein the coolant is not allowed to circulate through the PCM heat sink but allowed through the battery rack.

In an embodiment, the different operating modes further comprising:

PCM cooling charge mode, wherein the coolant is allowed to circulate through the PCM heat sink but not through the battery rack.

In an embodiment, the energy storage module is configured to be used for at least one of: energy storage case and frequency regulation case.

In an embodiment, for the energy storage case the valve system comprises at least two 3-way valves.

In an embodiment, for the frequency regulation case the valve system comprises at least one 3-way valve.

In an embodiment, the PCM heat sink is arranged inside a housing of the energy storage module or external to the housing.

In an embodiment, a first 3-way valve of the valve system is arranged downstream to the chiller and upstream to the PCM heat sink.

In an embodiment, a second 3-way valve of the valve system is arranged downstream to a first 3-way valve.

In an embodiment, the PCM heat sink is arranged upstream to the battery rack.

In an embodiment, in the PCM cooling charge mode, a first 3-way valve is configured to allow the coolant to circulate through the PCM heat sink.

In an embodiment, a second 3-way valve is configured to prevent the coolant to circulate from the PCM heat sink to the battery rack.

In an embodiment, in the battery cooling mode, a first 3-way valve is configured to allow the coolant to circulate to a second 3-way valve, the second 3-way valve is configured to allow the coolant to circulate through the PCM heat sink and therefrom through the battery rack.

In an embodiment, in the battery heating mode, a first 3-way valve and a second 3-way valve are configured to prevent the coolant to circulate through PCM heat sink and the second 3-way valve is further configured to allow the coolant to circulate through the battery rack.

In an embodiment, the battery heating mode comprising a circulation mode as a sub-mode, wherein in the circulation mode a heater of the chiller is turned off or to a lower temperature compared to the heating mode.

In an embodiment, in the PCM cooling charge mode, the chiller supply coolant having temperature in a range of 5-10° C.

In an embodiment, in the battery cooling mode, the chiller supply coolant having temperature in a range of 10-20° C.

In an embodiment, in the battery heating mode, the chiller supply coolant having temperature in a range of 20-35° C.

In an embodiment, the piping system is connected to the battery rack via connectors, wherein a battery module of the battery rack is placed on a cold plate and the cold plate is connected to the connectors.

In an embodiment, the connectors enable the coolant to flow into the cold plate under the battery module to add or remove heat based on the operating mode.

In an embodiment, battery modules with underlying cold plates are stacked vertically to the battery rack.

According to a second example aspect of the disclosed embodiments there is provided an energy storage module comprising the energy storage cooling system of the first aspect.

According to a third example aspect of the disclosed embodiments there is provided a computer implemented method for controlling an energy storage cooling system for an energy storage module comprising a chiller for supplying a coolant; a PCM heat sink comprising a heat exchanger; a piping system for circulating the coolant between the chiller, the heat exchanger and a battery rack of the energy storage module; and a valve system comprising at least one 3-way valve arranged upstream to the PCM heat sink and to the battery rack; the method comprising:

determining operating modes for controlling the 3-way valves;

controlling, in battery cooling mode, the coolant to be allowed to circulate through PCM heat sink and through the battery rack; and controlling, in battery heating mode, the coolant not to be allowed to circulate through PCM heat sink but allowed through the battery rack.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
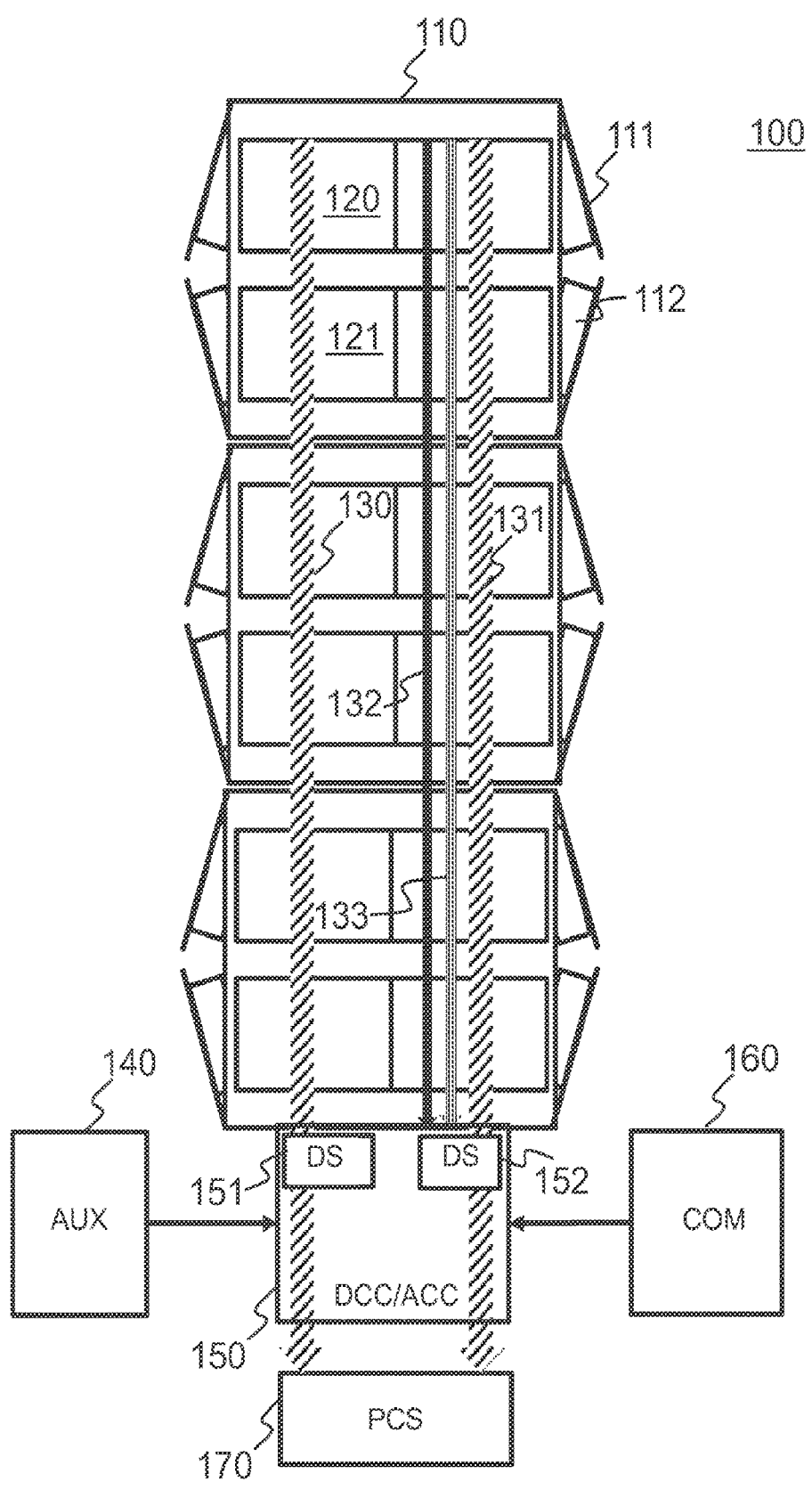
FIG. 1 shows a schematic picture of an energy storage system according to an aspect of the disclosed embodiments.

FIG. 1 shows a schematic picture of an energy storage system 100 according to an example embodiment. Only selected parts relevant to embodiments are disclosed.

Energy storage market is shifting to address scalability and ease of deployment using smaller more productized form factors, for example. Such approach also enables other advantages like possibility to minimize field installation time, optimize for logistics and transportation and productize and certify a fundamentally simpler system, for example.

In an embodiment, an energy storage system 100 comprises a plurality of interconnected storage modules 110. In FIG. 1, three modules are illustrated as an example, but the number may vary from one to tens of modules.

Each module 110 may comprise at least one door 111 to provide access to battery compartment within the module 111 comprising at least one battery rack 120-121. Number of battery racks per module may vary but in FIG. 1, four racks 120-121 in each module is shown. For example, one module 110 may comprise up to 1490.4 kWh each (4×372.6 kwh racks).

For cooling purposes, a chiller 112 may be arranged to the module 110—In an embodiment as in FIG. 1, the chiller 112 is arranged to the door's 111 inner side but the location can be in other parts of the module 110 too.

Two DC buses 130-131 (e.g. 2×1250 Amp) are configured to interconnect batteries of the plurality of modules 110 to DCC/ACC inverter 150 and eventually to a power control system PCS 170 in daisy chain. The DCC/ACC inverter 150 may comprise additional elements, such as disconnect switches DS 151-152, for example.

Auxiliary power element 140 may be connected to the inverter 150 to provide auxiliary power to be arranged for the modules 110 via an aux power bus 132 interconnecting the modules in daisy chain.

Status and control information may be provided to the system 100 via a communication element 160 that may be connected through the inverter 150 to a communication bus 133 interconnecting the modules in daisy chain.

Figures 2, 3:
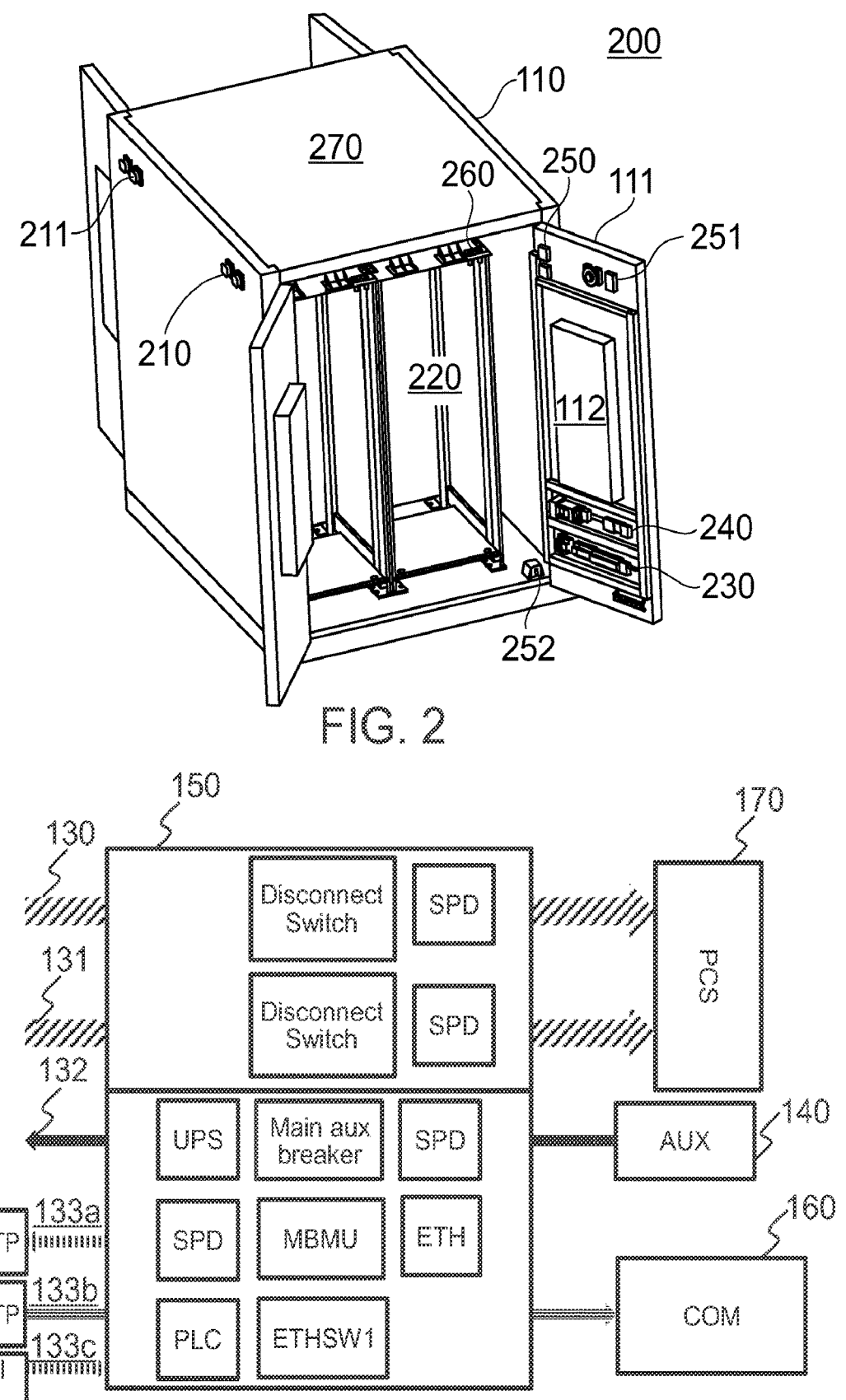
FIG. 2 shows a schematic view on a storage module and some parts of it according to an aspect of the disclosed embodiments.
FIG. 3 shows a schematic picture of an ACC/DCC outdoor cabinet components in accordance with an example embodiment.

FIG. 2 shows a schematic view 200 on a storage module 110 and some parts of it according to an aspect of the disclosed embodiments.

The storage module 110 comprises at least one door 111 and a chiller 112 (e.g. 2.5 kW) may be arranged to the door 111, for example.

Module to module (M2M) connectors 210-211 may be arranged in opposite sides of the housing in recesses to enable reliable interconnection between modules 110 and ability to place the neighboring modules close to each other and enable easy scalability. (M2M) connectors 210-211 may comprise DC bus/AC aux/Comms interconnections as disclosed with FIG. 1.

Battery compartment 220 is shown inside the module 110 where the battery racks (not shown) may be arranged.

An AC aux distribution and UPS 230 may be arranged also to the door 111, for example. A remote I/O 240 may also be arranged to the door 111, for example.

A smoke/heat detector 250 may be provided, as well as a H2 sensor 251 and a door position sensor 252.

A dry pipe/nozzle 260 is shown within the compartment 220.

The modules 110 may comprise pressure relief plates 270 as illustrated in FIG. 2.

FIG. 3 shows a schematic picture of an ACC/DCC outdoor cabinet 150 components in accordance with an example embodiment.

Not all possible components are disclosed and not all components are mandatory for all embodiments, but FIG. 3 merely discloses an exemplary embodiment.

FIG. 3 illustrates how DC busses 130-131 are connected from the interconnected modules from the left of FIG. 3 to the ACC/DCC inverter 150 and to PCS 170. The PCS may cover e.g. 3700 kVA. ACC/DCC inverter 150 also comprises disconnect switches and SPD's as shown. Communication bus 133*a-c* interfaces are also illustrated.

Site auxiliary power 140 may be connected to aux bus 132 towards the interconnected modules.

BMS STP may be connected to site communication network 160.

Exemplary Items Shown in FIG. 3:

BMS STP 133*a-b*=Battery management system interface 133*a-b* for the storage modules and associated battery modules of the battery racks. This interface is used to control, for example, battery charging and discharging. The interface 133*a-b* may be one component of the communication bus 133, implemented using a STP cable between storage modules, for example. BMS STP 133*a* may be used for transceiving information from the MBMU to storage modules and associated battery modules/racks/battery modules/cells, for example. BMS STP 133*b* may be used for transceiving information from storage modules/racks/battery modules/cells to MBMU and/or further to the communication network 160, for example.

Signal STP=signal interface 133*c* for controlling valves (see PLC) and other sensors of the chained modules, and record data when necessary.

SPD=Surge Protective Devices to protect from electrical power surges known as transient overvoltage, for example.

MBMU=Master Battery Management Unit for controlling charging/discharging of battery modules within the chained storage modules 110.

PLC=Programmable Logic Controller for controlling valves and other sensors, and record data when necessary.

ETH=Ethernet interface to provide communication link between the MBMU and the Ethernet switch ETHSW1.

ETHSW1=Ethernet switch to provide communication interface between the ACC/DCC inverter 150 and the communication network 160 for interfaces 133*a-c*, for example.

Figure 4A:
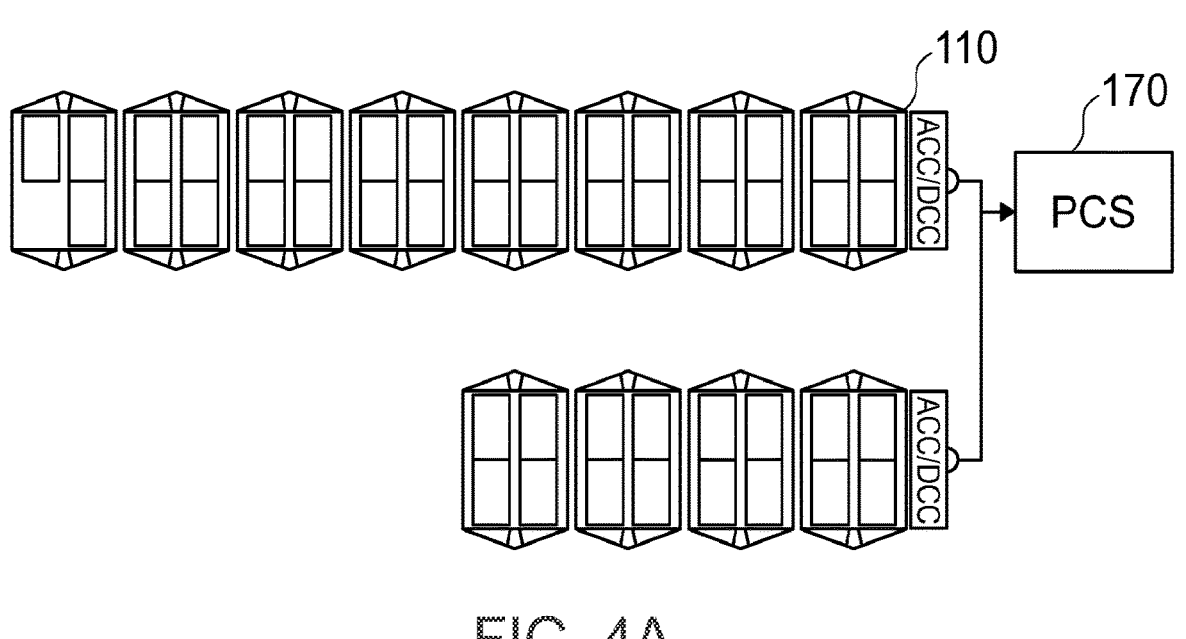
FIG. 4a shows a schematic picture of a first exemplary configuration for energy storage system in accordance with an example embodiment.

FIG. 4*a* shows a schematic picture of a first exemplary configuration for energy storage system in accordance with an example embodiment.

In an embodiment, a PE PCSK PCS 170 is rated at 3700 kVA. Storage capacity may be e.g. 14% overbuilt to compensate for losses and capacity loss. Overall battery capacity may provide 3700×4×1.14 kWh=16872 kWh or 46 racks in 12 modules 110 (16872/372.7=46). Given 8 module per row limit the system building block can be arranged in 1×8+1×4 configuration, for example.

Figure 4B:
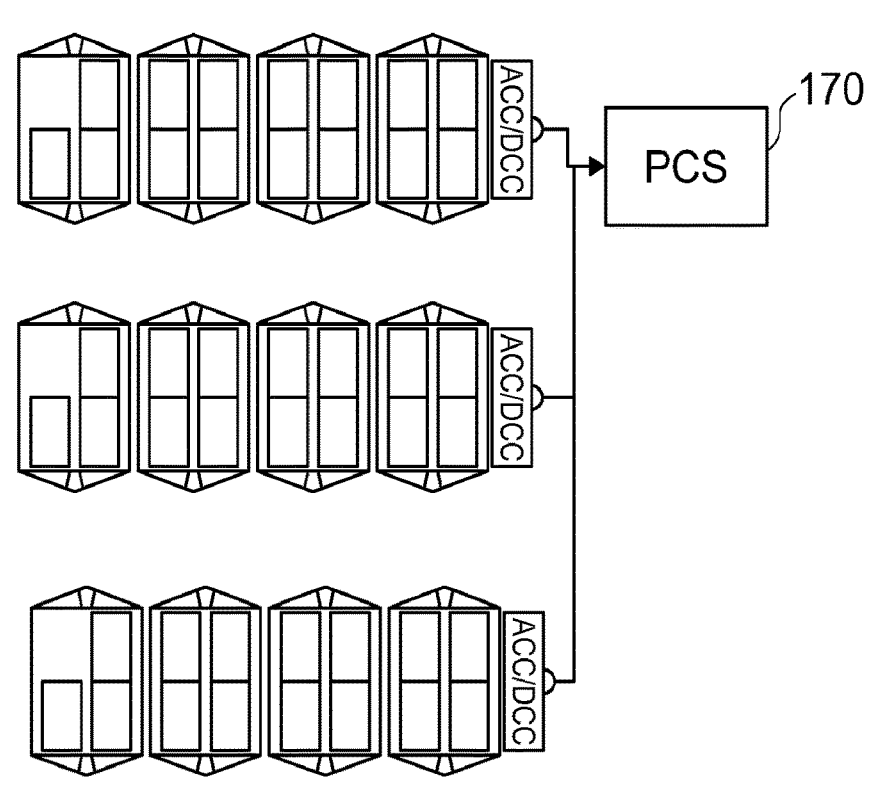
FIG. 4b shows a schematic picture of a second exemplary configuration for energy storage system in accordance with an example embodiment.

FIG. 4*b* shows a schematic picture of a second exemplary configuration for energy storage system in accordance with an example embodiment. In such configuration, given 4 module per row limit the system building block can be arranged in 3×4 configuration, for example.

A known technique for cooling energy storage modules includes circulating coolant between the energy storage cells. Coolant passages are typically incorporated into the energy storage module such heat within the storage cells is transferred to the circulating coolant. Coolant may be circulated by a pump through the energy storage module and then through a radiator or other type of heat exchanger. Coolant must be circulated whenever a predetermined portion of the energy storage module reaches a maximum allowed temperature.

A phase change material (PCM) has been used within energy storage modules to eliminate the need for coolant circulation. The material is typically made of graphite that is impregnated with paraffin wax. The phase change material is thermally conductive and is capable of absorbing heat in the form of latent heat as the paraffin changes state from solid to liquid. The phase change material acts as a normal heat sink material after the paraffin has reached the liquid state. The phase change material works well and can eliminate the need for circulation of coolant if either the heat generated by the storage cells or the ambient temperature does not exceed the melting temperature of the paraffin wax.

However, an improved cooling system is needed. Such cooling system is needed to take into consideration different external temperatures and/or usage characteristics, for example.

Figure 5:
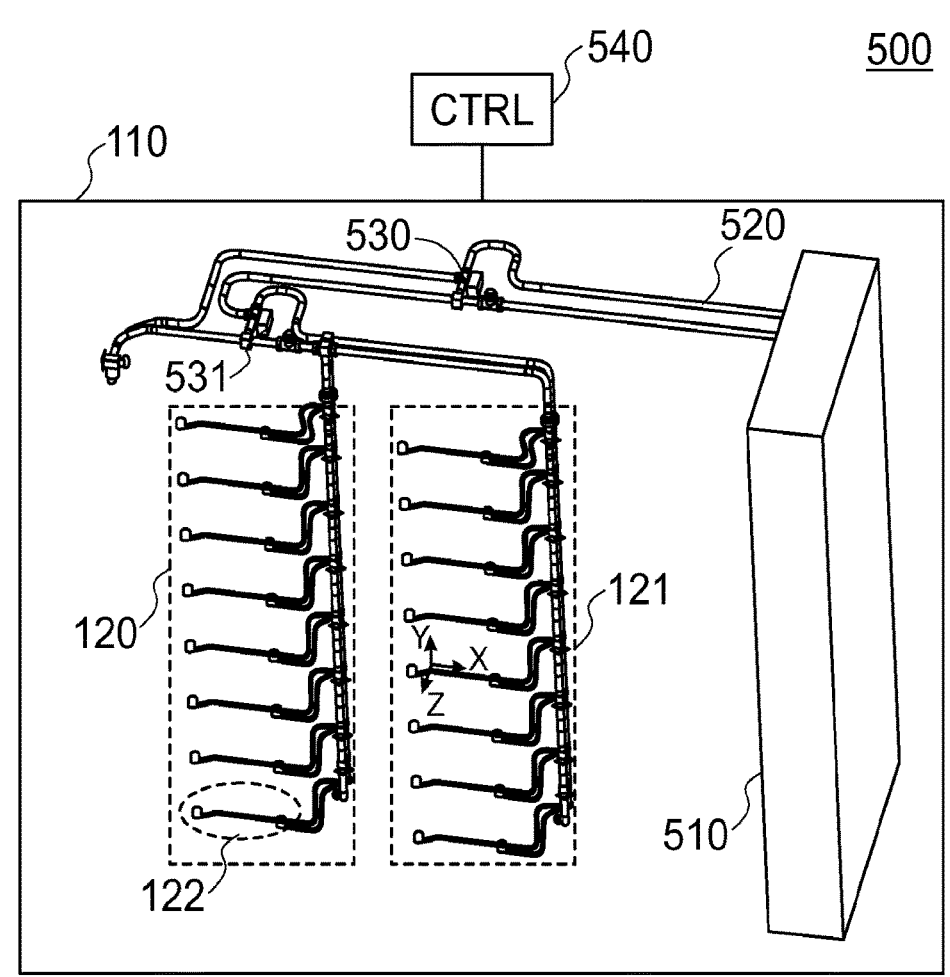
FIG. 5 shows a schematic picture of a cooling system in accordance with an example embodiment.

FIG. 5 shows a schematic picture of a cooling system 500 in accordance with an example embodiment.

In an embodiment, a cooling system 500 for energy storage modules 110 may be configured to be controlled using different operating modes.

In an embodiment, an energy storage cooling system 500 for an energy storage module 110 comprises a PCM heat sink 510 comprising a heat exchanger; a piping system 520 for circulating a coolant between the heat exchanger 510 and a battery rack 120, 121 of the energy storage module 110; a valve system 530-531 comprising at least one 3-way valve 530, 531 arranged upstream to the PCM heat sink 510 and to the battery rack 120, 121; a control unit 540 configured to control the valve system 530, 531 in different operating modes comprising at least following modes:

battery cooling mode, wherein the coolant is allowed to circulate through PCM heat sink 510 and through the battery rack 120, 121; and battery heating mode, wherein the coolant is not allowed to circulate through PCM heat sink 510 but allowed through the battery rack 120, 121.

In an embodiment, the different operating modes may further comprise a PCM cooling charge mode, wherein the coolant is allowed to circulate through PCM heat sink 510 but not through the battery rack 120, 121.

In an embodiment, the PCM heat sink 510 comprises PCM (Phase Change Material) material arranged in connection with the heat exchanger.

In an embodiment, a coolant may be used for cooling or warming, depending on the operating mode and/or temperature.

In an embodiment, the piping system 520 may be connected to battery racks 120, 121 via connectors 122. For example, each battery module of the battery rack 120, 121 may be placed on a cold plate and the cold plate is connected to the connectors 122. Battery modules with underlying cold plates may be stacked vertically to the rack 120, 121. The connectors 122 may be QC connectors enabling coolant to flow into the cold plate, which is under battery module to add/remove heat in controlled way.

The PCM heat sink 510 may be placed inside the storage module 110, between the racks 120, 121, on top of the racks 120, 121 or between the racks 120, 121 and the internal housing wall of the storage module 110. One further option is to locate the PCM heat sink 510 outside the energy storage module 110.

The cooling system 500 provides many advantageous effects, such as extra cooling capacity to the energy storage system, shift chiller work hour to night time to increase efficiency, stabilize return coolant temperature to reduce chiller power consumption, keep battery warm without using extra energy (if previously heat charged by battery operating cycle), and minimize explosion cascade from container to container, for example.

In an embodiment, the coolant may comprise 50% water and 50% glycol, for example.

Figure 6A:
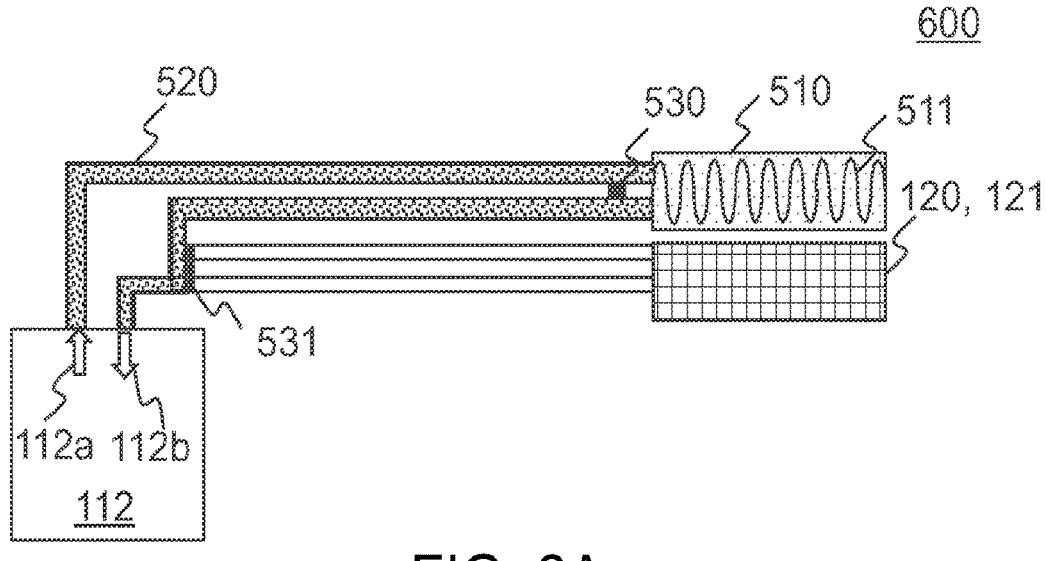
FIGS. 6a-c show schematic pictures of different operating modes in accordance with an example embodiment.
Figure 6B:
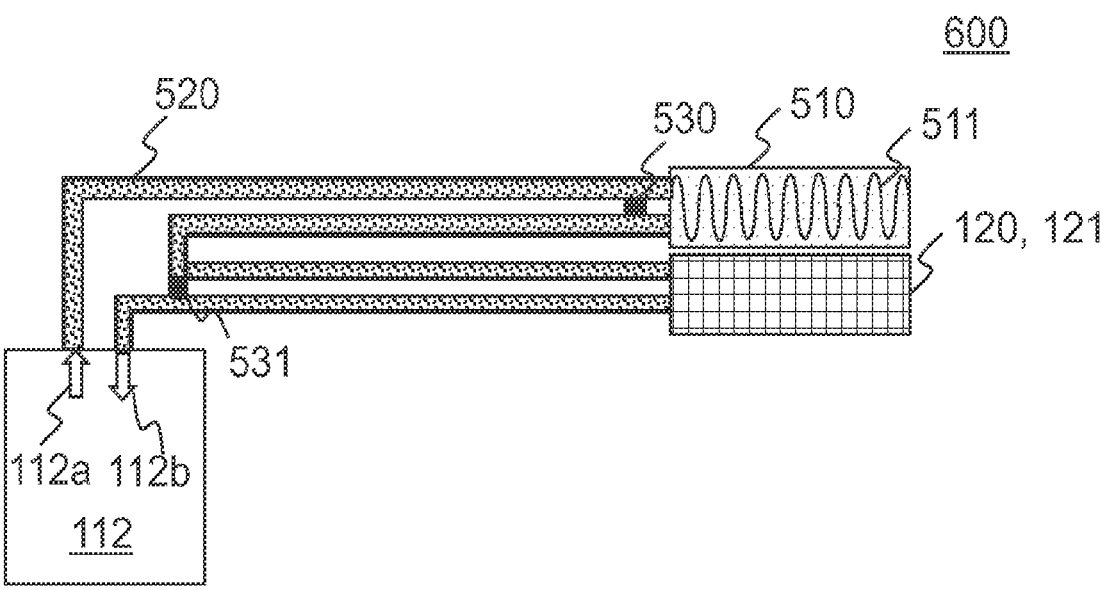
Figure 6C:
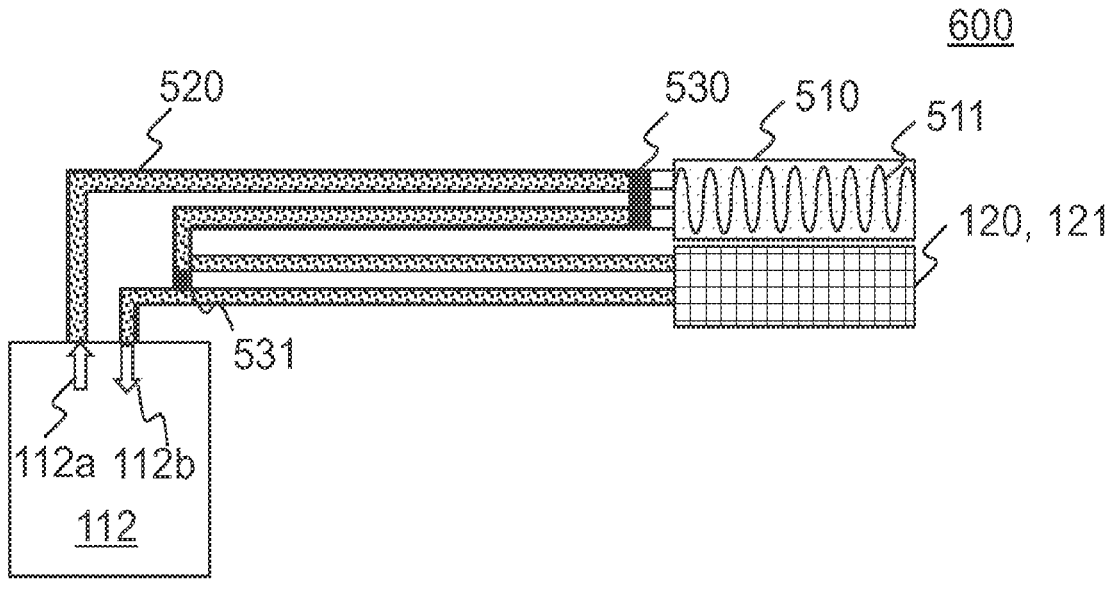

FIGS. 6a-c show schematic pictures of different operating modes in accordance with an example embodiment.

In an embodiment, an energy storage cooling system 600 for an energy storage module comprises a PCM heat sink 510 comprising a heat exchanger, a piping system 520 for circulating a coolant between the heat exchanger 511 and a battery rack 120, 121 of the energy storage module; a valve system 530-531 comprising 3-way valves 530, 531 arranged upstream to the PCM heat sink 510 and to the battery rack 120, 121.

FIG. 6a shows a PCM cooling charge mode, wherein a coolant is allowed to circulate through PCM heat sink 510 but not through the battery rack 120, 121. In this mode the effect is to charge the PCM heat sink 510 with "cooler" supply 112a (e.g. about 5°–10° C.) thermal energy while cooling of battery racks 120, 121 is not needed. When in the PCM cooling charge mode, the coolant temperature will be very low, and the flow is controlled to flow between a chiller 112 and the PCM heat sink 510 to accelerate the cooling charge speed. The flow is controlled by the valves 530, 531 to define the flow path being chiller-PCM-chiller. Chiller output flow 112a to the piping system 520 is colder than the chiller input flow 112b when returning back to the chiller 112.

PCM cooling charge mode may be used as a nighttime mode to chill the PCM heat sink 510 for another mode (e.g. battery cooling mode). During nighttime and due to lower ambient temperature higher efficiency of chiller 112 can be used to charge cooler thermal energy to the PCM heat sink 510.

FIG. 6b shows a battery cooling mode, wherein a coolant is allowed to circulate through the PCM heat sink 510 and through the battery rack 120, 121.

In this mode the effect is to cool supplied 112a (e.g. around 15° C.) coolant using PCM heat sink 510 thermal energy before routing the PCM heat sink 510 cooled coolant flow to battery racks 120, 121. When in the battery cooling mode, the coolant temperature will be around 15° C.-18° C. and controlled to flow into PCM heat sink 510 and to the battery rack 120, 121, to provide extra cooling capacity. The flow is controlled by the valves 530, 531 to define the flow path being chiller-PCM-battery rack-chiller.

Battery cooling mode may be used as a normal operating mode to maintain or adjust the battery rack 120, 121 temperature for optimum operating temperature with the aid of PCM heat sink 510. Typically, in battery cooling mode heat is removed from battery modules/cells in the racks.

In an embodiment, battery cooling mode may also be used for heating. In this mode the effect is to warm battery rack 120, 121 with "warmer" supply 112a (e.g. around 15-25° C.) thermal energy when a PCM heat sink 510 can utilize stored heat of the PCM heat sink due to warmer ambient temperature of daytime. In this case no heater of the chiller 112 needs to be activated yet. This may be useful when ambient temperature rapidly decreases from daytime towards nighttime, for example. Thus, the chiller 112 may be merely used to enable coolant flowing through the flow path of chiller-PCM-battery-chiller.

For example, energy storage battery finished one cycle in the daytime, and during the night, ambient temperature reduced a lot and the temperature of battery needs to be maintained. In this situation, the heater inside the chiller 112 needs not yet to be turned on but it is possible to use the heat stored in the PCM heat sink to warm up the energy storage battery. This may be a rare situation though since most of the time the PCM heat sink 510 is there to help the chiller 112 to remove heat from battery 120, 121. However, this kind battery warm up sub-mode for the battery cooling mode may be useful when transitioning from battery cooling mode to battery heating mode (FIG. 6c).

FIG. 6c shows a battery heating mode, wherein a coolant is not allowed to circulate through a PCM heat sink 510 but allowed through the battery rack 120, 121.

In this mode the effect is to warm battery rack 120, 121 with "warmer" supply 112a (e.g. around 25-30° C.) thermal energy when PCM heat sink 510 related cooling of battery racks 120, 121 is not needed. This may be useful in colder environments, for example. When in battery heating mode, the coolant flow is controlled to flow battery rack(s) only, to warm up battery temperature for a better charge and discharge window. The flow is chiller-battery rack-chiller.

Battery heating mode add heat to battery rack and battery modules/cells in each rack.

Figure 7:
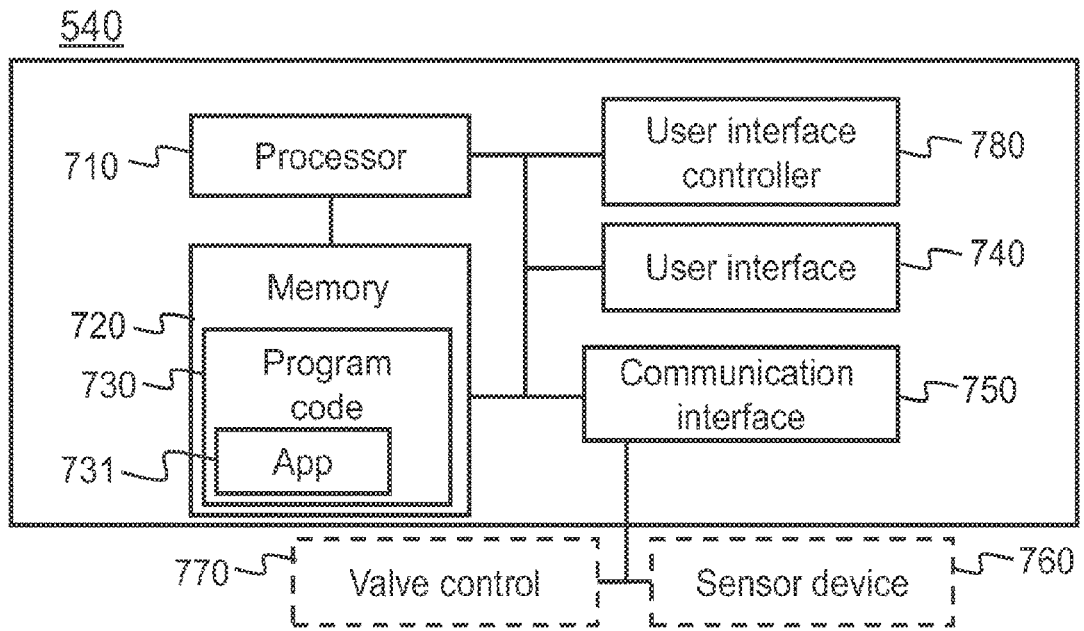
FIG. 7 presents an example block diagram of a control apparatus in which various embodiments of the invention may be applied.

FIG. 7 presents an example block diagram of a control apparatus 540 in which various embodiments of the invention may be applied. The apparatus 540 may be a control device arranged to an energy storage module 110, to an energy storage system 100, a power plant control apparatus, a user equipment (UE), user device or apparatus, such as a remote computer system.

The general structure of the apparatus 540 may comprise a user interface 740, a communication interface 750, a processor 710, and a memory 720 coupled to the processor 710. The apparatus may 540 further comprise software 730 stored in the memory 720 and operable to be loaded into and executed in the processor 710. The software 730 may comprise one or more software modules and can be in the form of a computer program product.

The apparatus 540 may be operationally connected to valves 530, 531 of the cooling system 100 to control operating modes. The apparatus 540 may also be operationally connected to sensor device(s) 760, such as temperature sensor to measure internal and/or externals temperatures of the storage module 110 and/or the battery racks 120, 121, or to measure some other environmental information, for example. The apparatus 540 may further comprise a user interface controller 780.

In an embodiment, coolant temperature, battery operating status and local time information may be used to control switching between the operating modes.

In an embodiment, a storage module 110 comprises a controller 710 for PLC to control the storage valves 770. Only one controller/processor 710 is shown, but the controller 710 may be a dedicated PLC controller or a controller 710 in charge for other module 110 operations.

In an embodiment, valve control 770 may be operated from the DCC/ACC inverter 150 (see FIG. 1) and/or from a remote computer over the communication network 160 (see FIG. 1).

The processor 710 may be, e.g., a central processing unit (CPU), a microprocessor, a digital signal processor (DSP), a graphics processing unit, or the like. FIG. 7 shows one processor 710, but the apparatus 540 may comprise a plurality of processors.

The memory 720 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 540 may comprise a plurality of memories. The memory 720 may be constructed as a part of the apparatus 540 or it may be inserted into a slot, port, or the like of the apparatus 540 by a user. The memory 720 may serve the sole purpose of storing data, or it may be constructed as a part of an apparatus serving other purposes, such as processing data. A proprietary data application (client control application) 731, control system data and environmental data may be stored to the memory 720.

The user interface controller 780 may comprise circuitry for receiving input from a user of the apparatus 540, e.g., via a keyboard, graphical user interface shown on the display of the user interfaces 740 of the apparatus 540, speech recognition circuitry, or an accessory device, such as a headset, and for providing output to the user via, e.g., a graphical user interface or a loudspeaker.

The communication interface module 750 implements at least part of data transmission. The communication interface module 750 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as universal serial bus (USB) for example. The communication interface module 750 may be integrated into the apparatus 540, or into an adapter, card or the like that may be inserted into a suitable slot or port of the apparatus 540. The communication interface module 750 may support one radio interface technology or a plurality of technologies. The apparatus 540 may comprise a plurality of communication interface modules 750.

A skilled person appreciates that in addition to the elements shown in FIG. 7, the apparatus 540 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 540 may comprise a disposable or rechargeable battery (not shown) for powering when external power if external power supply is not available.

In an embodiment, the apparatus 540 comprises speech recognition means. Using these means, a pre-defined phrase may be recognized from the speech and translated into control information for the apparatus 540, for example.

The valve control automation 770 and the sensor device 760 may be configured to be comprised by the apparatus 540 or connected as separate devices to the apparatus 540. In case the valve control 770 and the sensor device 760 are comprised in the apparatus 540 they may be connected to the apparatus 540 using an internal bus of the apparatus 540. If elements 760-770 are external devices connected to the apparatus 540, they may be connected to the apparatus 540 using communication interface 750 of the apparatus 540 or using the internal bus.

Figure 8:
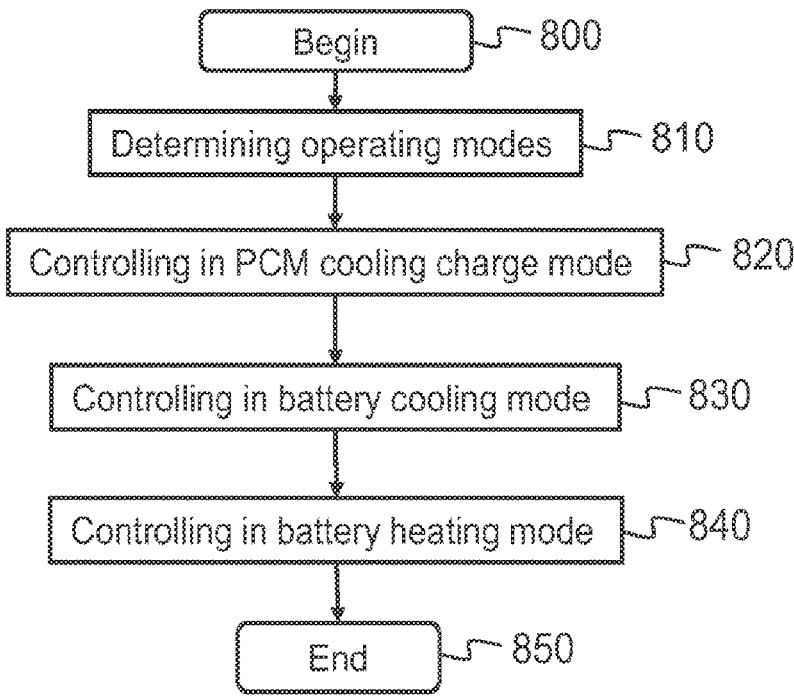
FIG. 8 shows a flow diagram showing operations in accordance with an example embodiment of the invention.

FIG. 8 shows a flow diagram showing operations in accordance with an example embodiment of the invention. In step 800, the computer implemented method for controlling an energy storage cooling system for an energy storage module is started. The system comprises a chiller for supplying a coolant; a PCM heat sink comprising a heat exchanger; a piping system for circulating the coolant between the chiller, the heat exchanger and a battery rack of the energy storage module; and a valve system comprising at least one 3-way valve arranged upstream to the PCM heat sink and to the battery rack.

In step 810, operating modes for controlling the 3-way valves are determined. In step 820, in PCM cooling charge mode, the coolant is controlled to be allowed to circulate through PCM heat sink but not through the battery rack. In step 830, in battery cooling mode, the coolant is controlled to be allowed to circulate through PCM heat sink and through the battery rack. In step 840, in battery heating mode, the coolant is controlled not to be allowed to circulate through PCM heat sink but allowed through the battery rack. The method is ended in step 850. Not all steps are mandatory, such as the PCM cooling charge mode.

Figure 9:
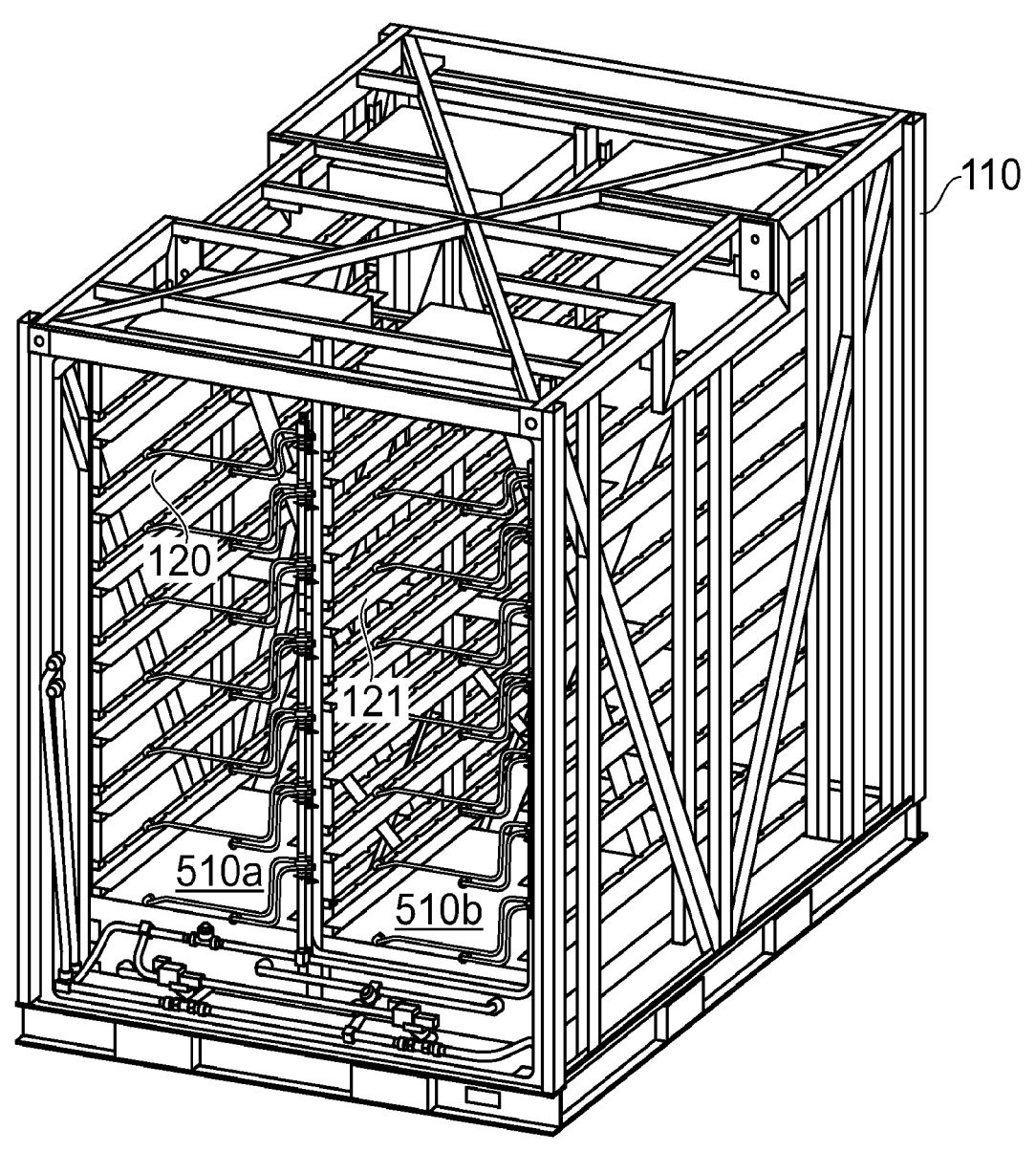
FIG. 9 shows another schematic view on a storage module and some parts of it according to an aspect of the disclosed embodiment.

FIG. 9 shows another schematic view on an energy storage module 110 and some parts of it according to an aspect of the disclosed embodiments.

In an embodiment, PCM heat sink(s) 510a,b is arranged inside the storage module 110 to the bottom of the module and under the battery rack(s) 120, 121. Also piping system of the cooling system is visible. PCM heat sink(s) 510a,b may also be arranged to other parts inside the module 110. Alternatively, or furthermore, PCM heat sink(s) 510a,b may also be arranged outside the module 110, for example on top of the module 110.

Throughout FIGS. 10-11 following exemplary parameters may be used:

"t1" corresponds to e.g. 5° C.

"t2" corresponds to e.g. 18° C.

"Nighttime" corresponds to e.g. "1 am-5 am"

"t3" corresponds to e.g. 5-15° C. as coolant supply temp and to e.g. 9° C. as comparison temp (used for example in PCM cooling charge mode)

"t4" corresponds to e.g. 10° C.

"Timer 1" corresponds to e.g. 10 min

"t5" corresponds to e.g. 15-25° C. as coolant supply temp and to e.g. 15° C. as comparison temp (used for example in heating, circulation and cooling modes)

"Time T1" corresponds to e.g. 1 hour

"t6" corresponds to e.g. 25-35° C. as coolant supply temp

"Timer 2" corresponds to e.g. 20 min

Different values for some of the temperatures, such as "t3" may depend on for what purpose the value is used for. If e.g. "t3" is used for supply temperature, it may cover a temp range like 5-15° C., whereas if "t3" is used as reference for comparison, a dedicated value from the range can be selected, like e.g. 9° C. However, both explicit temperature values or temperature ranges can be used for any temperature value t1-t6.

Figure 10A:
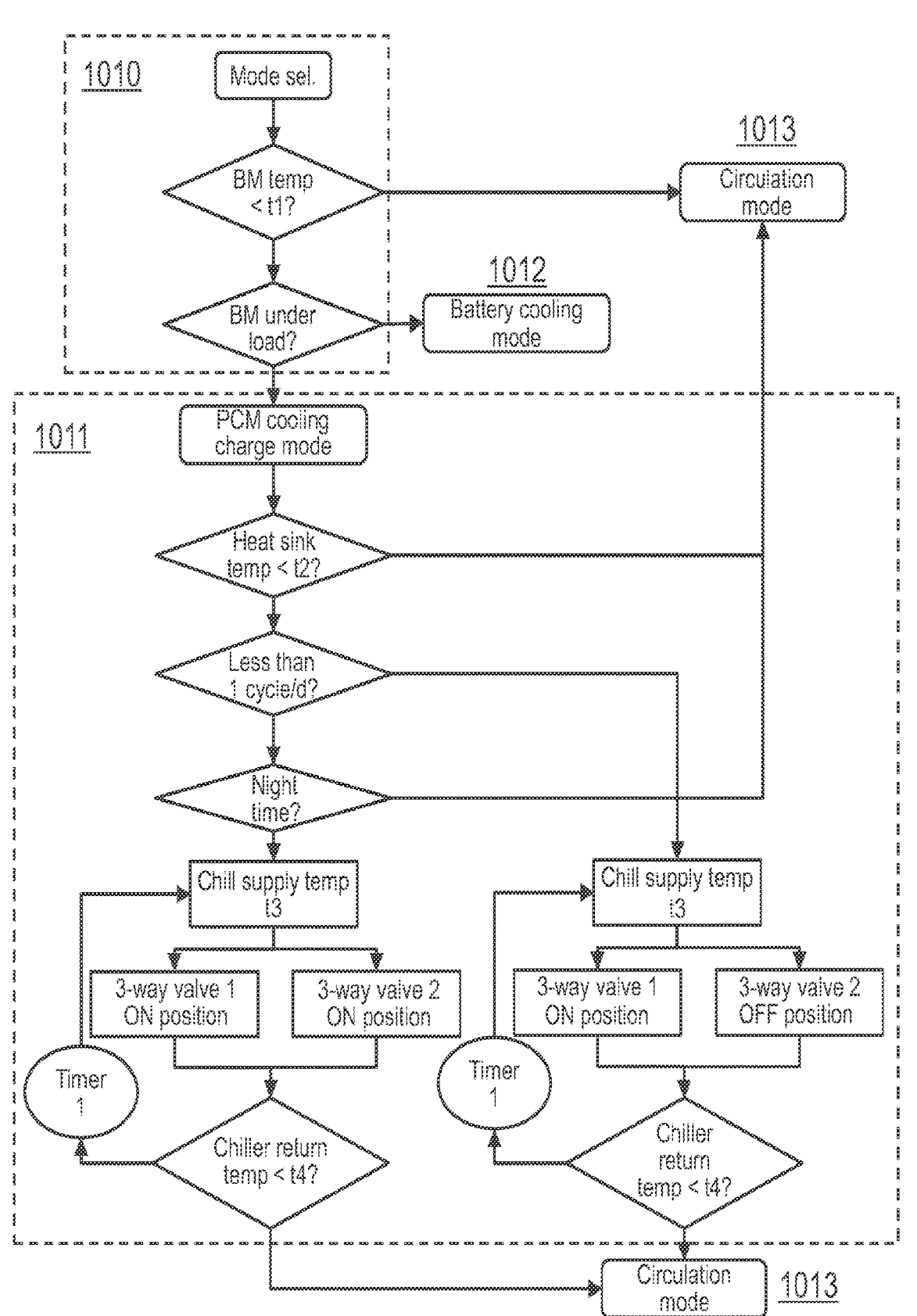
FIGS. 10a-c show schematic views on control operations in different operating modes of the energy storage cooling system.

In FIG. 10a, a selection of exemplary features of the control method is shown.

Mode selection mode 1010 is shown. The mode 1010 is configured to be an initial operating mode when starting up the control procedure, for example.

First, battery module (BM) temperature is compared to a first reference value t1 (e.g. t1=5° C.). If BM temperature is lower than t1 then control mode is switched to Circulation mode 1013 (see e.g. FIG. 10c). If BM temperature is higher than t1 then BM load is checked.

Figure 10B:
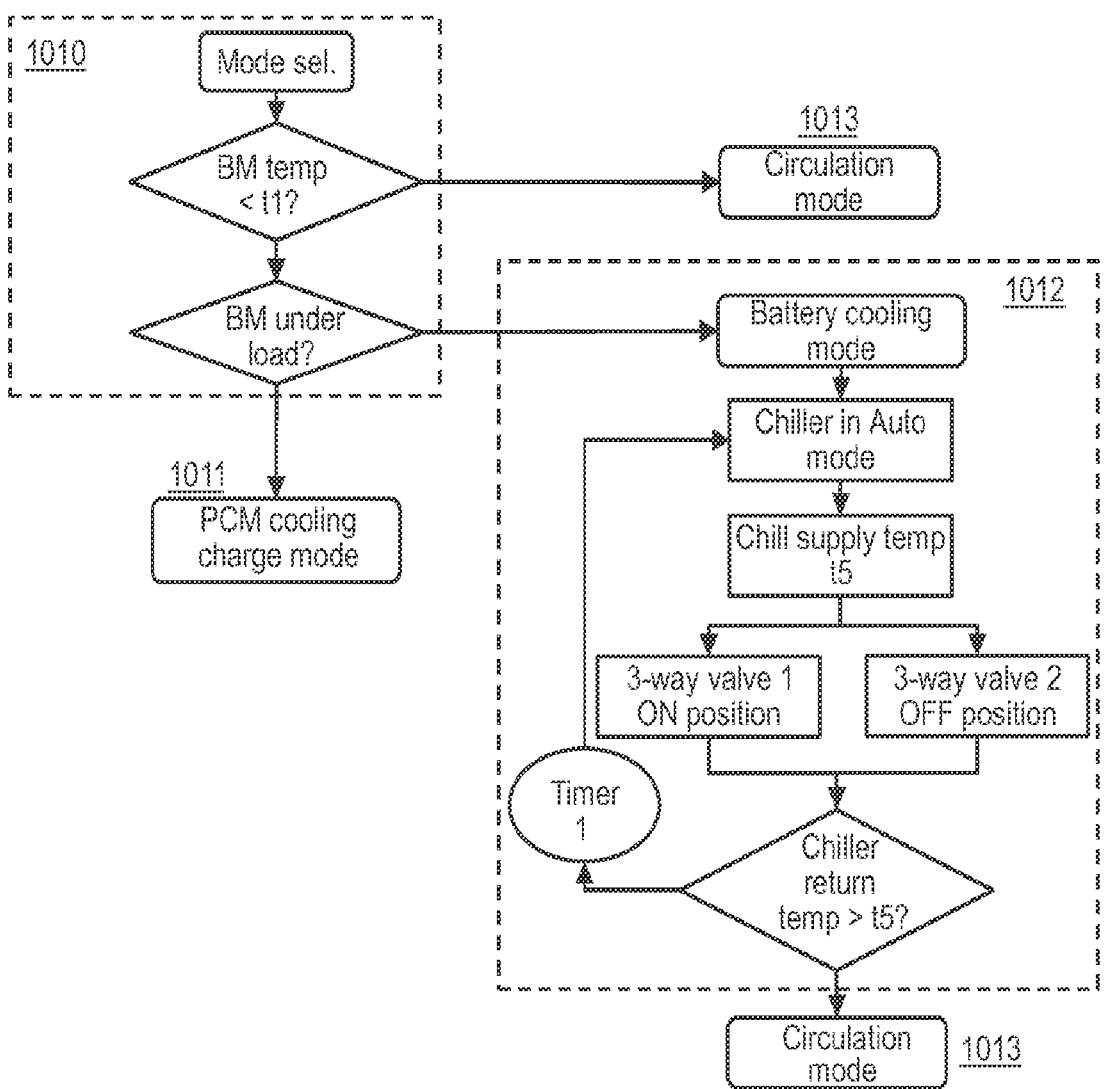

Then, if BM is under load then control mode is changed to battery cooling mode 1012 (see e.g. FIG. 10b). If BM is not under load then control mode is changed to PCM cooling charge mode 1011.

In an embodiment, PCM cooling charge mode 1011 is active.

First, heat sink temperature is checked and compared to a second reference value t2 (e.g. t2=18° C.). If the heat sink temperature is lower than t2 then control mode is changed to Circulation mode 1013. If the heat sink temperature is higher than t2 then cycle frequency is checked.

Then, if there are less than 1 cycle/day, for example, then current time is checked. If the system is designed for more cycles per day, then chiller supply temperature is set to t3 (e.g. t3=9° C.).

When current time is checked, it is determined if the time is "nighttime" (e.g. between 1 am and 5 am). If it is "nighttime", then chiller supply temperature is set to t3 (e.g. t3=9° C.) and 3-way valve 1 and 2 are both set to ON position. After that chiller return temperature is compared to t4 (e.g. t4=10°) and if the chiller return temperature is higher than t4, then Timer 1 (e.g. 10 min) is triggered, and after Timer 1 (e.g. 10 min), chiller supply temperature is again set to t3 (e.g. t3=9° C.). If the chiller temperature is equal to or lower than t4, then control mode is changed to Circulation mode 1013. Also, if it is not "nighttime", then control mode is changed to Circulation mode 1013.

Then, if there are more than 1 cycle/day, for example, chiller supply temperature is set to t3 (e.g. t3=9° C.) and 3-way valve 1 is set to ON and 3-way valve 2 is set to OFF position. After that chiller return temperature is compared to t4 (e.g. t4=10°) and if the chiller return temperature is higher than t4, then Timer 1 (e.g. 10 min) is triggered, and after Timer 1 (e.g. 10 min), chiller supply temperature is again set to t3 (e.g. t3=9° C.). If the chiller temperature is lower than t4, then control mode is changed to Circulation mode 1013.

In FIG. 10b, another selection of exemplary features of the control method is shown.

Mode selection mode 1010 is shown. The mode 1010 is configured to be an initial operating mode when starting up the control procedure, for example.

First, battery module (BM) temperature is compared to a first reference value t1 (e.g. t1=5° C.). If BM temperature is lower than t1 then control mode is switched to Circulation mode 1013 (see e.g. FIG. 10c). If BM temperature is higher than t1 then BM load is checked.

Then, if BM is under load then control mode is changed to battery cooling mode 1012. If BM is not under load, then control mode is changed to PCM cooling charge mode 1011 (see e.g. FIG. 10a).

In an embodiment, battery cooling mode 1012 is active.

First, chiller is set to Auto mode where the chiller is configured to be switched on to supply coolant with set temperature. The chiller is set to supply coolant with temperature t5 (e.g. t5=15° C.-25° C.). In Auto mode, the chiller is configured to be controlled (by the control unit or by the chiller logic) and decide cooling or heating based on cooling and heating set temperatures.

Then, 3-way valve 1 is set to ON and 3-way valve 2 is set to OFF position.

Then, chiller return temperature is compared to t5 (e.g. t5=15° C.) and if the coolant temperature is lower than t5, then Timer 1 (e.g. 10 min) is triggered, and after Timer 1 (e.g. 10 min), chiller is again set to Auto mode. If the chiller temperature is higher than t5 (e.g. t5=15° C.), then control mode is changed to Circulation mode 1013.

Figure 10C:
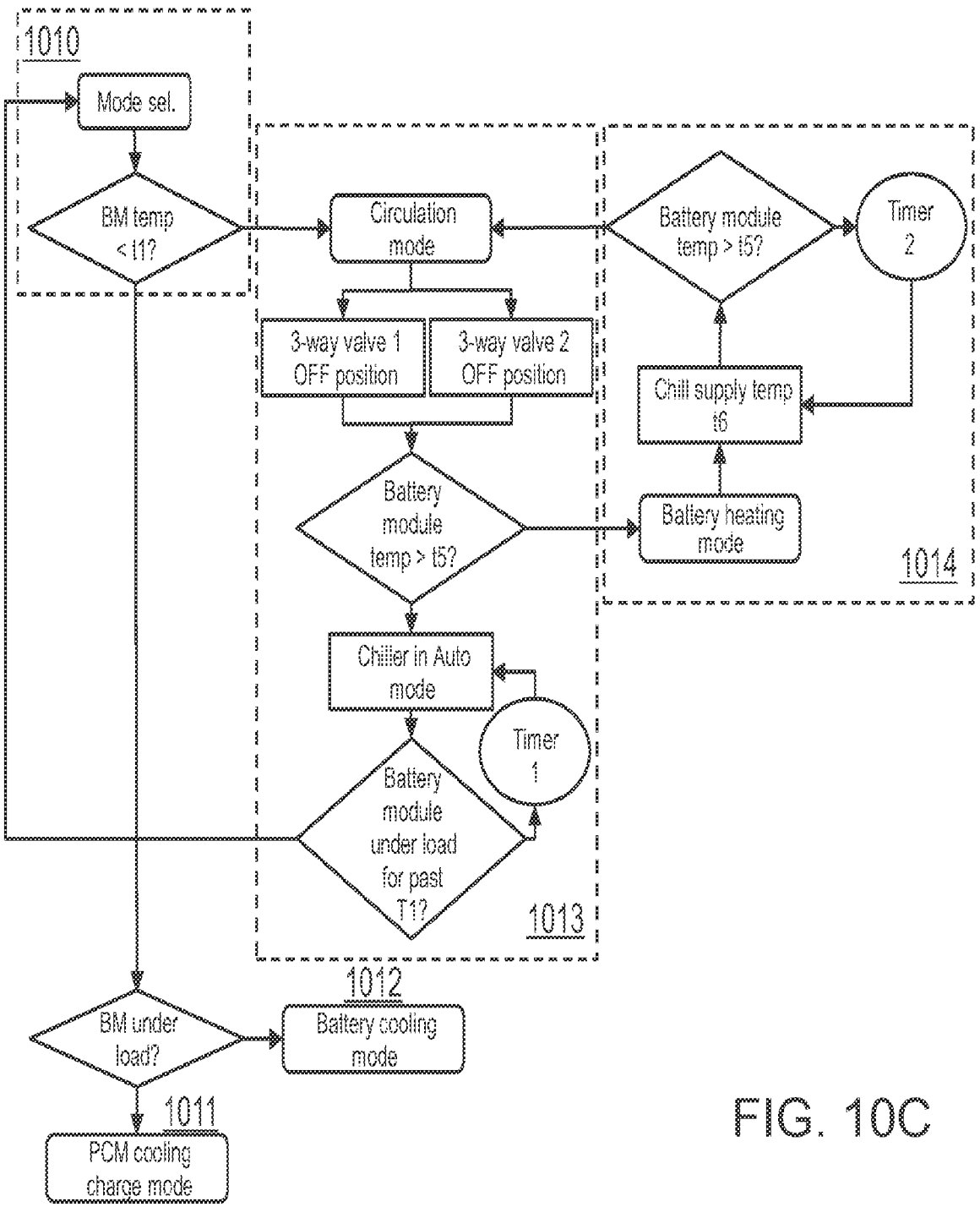

In FIG. 10c, another selection of exemplary features of the control method is shown.

Mode selection mode 1010 is shown. The mode 1010 is configured to be an initial operating mode when starting up the control procedure, for example.

First, battery module (BM) temperature is compared to a first reference value t1 (e.g. t1=5° C.). If BM temperature is lower than t1 then control mode is switched to Circulation mode 1013. If BM temperature is higher than t1 then BM load is checked.

Then, if BM is under load then control mode is changed to battery cooling mode 1012. If BM is not under load, then control mode is changed to PCM cooling charge mode 1011 (see e.g. FIG. 10a).

In an embodiment, Circulation mode 1013 is active in response to BM temperature comparison.

First, 3-way valve 1 is set to OFF position and 3-way valve 2 is set to OFF position.

Then, battery module (BM) temperature is compared to t5 (e.g. t5=15° C.) and if the BM temperature is higher than t5 (e.g. t5=15° C.), then chiller is set to Auto mode where the chiller is configured to be switched on to supply coolant with set temperature. If the BM temperature is lower than t5 (e.g. t5=15° C.), then control mode is changed to battery heating mode 1014. In Auto mode, the chiller is configured to be controlled (by the control unit or by the chiller logic) and decide cooling or heating based on cooling and heating set temperatures.

Then, it is checked if battery module (BM) has been under load for past time period T1 (e.g. Time T1=1 hour). If having been under load, then control mode is changed back to control mode selection 1010. If not having been under load, then Timer 1 (e.g. 10 min) is triggered, and after Timer 1 (e.g. 10 min), chiller is again set to Auto mode.

In an embodiment, battery heating mode 1014 is active in response to BM temperature is lower than t5 (e.g. t5=15° C.), as shown in FIG. 10c.

First, chiller supply temperature is set to t6 (e.g. t6=25° C.-35° C.).

Then, battery module (BM) temperature is compared to t5 (e.g. t5=15° C.) and if the BM temperature is higher than t5, then control mode is changed to Circulation mode 1013. If the BM temperature is lower than t5, then Timer 2 (e.g. Timer 2=20 min) is triggered, and after Timer 2 (e.g. 20 min), chiller supply temperature is again set to t6 (e.g. t6=20° C.).

Typically, when stating that a 3-way valve is in ON position it is meant that the valve is configured to bypass flow and when stating that a 3-way valve is in OFF position it is meant that the valve is configured to straight flow.

Battery module (BM) temperatures may vary module by module, even cell by cell. A battery module may have a plurality of temperature sensors (e.g. eight sensors) inside storage module and control system may receive different temperatures (e.g. eight temperatures). Due to that, BM temperature used to trigger different control functions of the cooling system may comprise temperature range Tmin–Tmax, wherein Tmin is the lowest temperature measured of the modules and Tmax is the highest temperature measured of the modules.

Figure 11A:
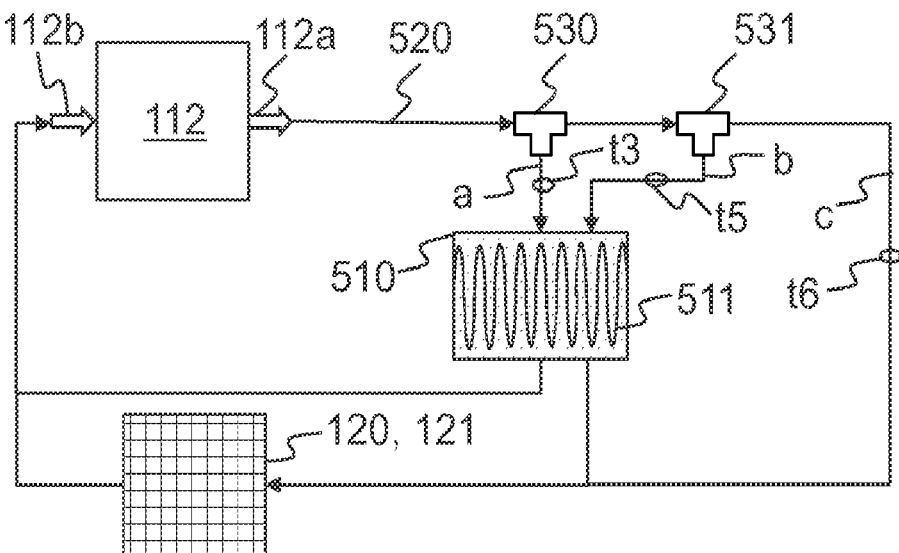
FIGS. 11a-b show schematic pictures of an energy storage cooling system in accordance with example embodiments for an energy storage case and a frequency regulation case.
Figure 11B:
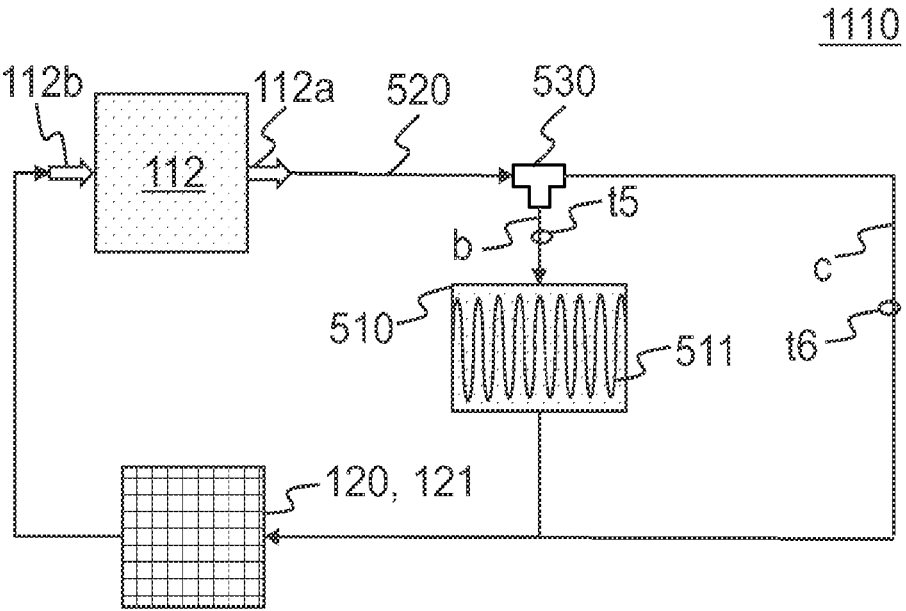

FIGS. 11a-b show schematic pictures of an energy storage cooling system in accordance with example embodiments for an energy storage case and a frequency regulation case. In an embodiment, for the energy storage case the valve system comprises at least two 3-way valves. In an embodiment, for the frequency regulation case the valve system comprises at least one 3-way valve.

In energy storage case, the system will be used for storing electricity for example within wind or solar farm where the system is aware when the storage is to charge and when it will discharge. Therefore, it is possible to determine e.g. a time frame for the PCM heat sink to store the cold energy when the battery module(s) is not under use, for example.

In frequency regulation case, the battery module(s) is constantly under charge and discharge, so the PCM heat sink have to connect with battery racks all the time and no certain time frame for PCM heat sink to store the cold energy.

Thus, the energy storage case may have three flow loops as shown in FIG. 11a, but the frequency regulation case may have only two flow loops as shown in FIG. 11b.

FIG. 11a shows a schematic picture of an energy storage cooling system in accordance with an example embodiment for an energy storage module for an energy storage case. In an embodiment, an energy storage cooling system 1100 for an energy storage module comprises a PCM heat sink 510 comprising a heat exchanger 511; a piping system 520 for circulating a coolant between the heat exchanger 511 and a battery rack 120, 121 of the energy storage module; a valve system 530-531 comprising at least one 3-way valve 530, 531 arranged upstream to the PCM heat sink 510 and to the battery rack 120, 121. The first 3-way valve 530 of the valve system is arranged downstream to the chiller 112 and upstream to the PCM heat sink 510. The second 3-way valve 531 of the valve system is arranged downstream to the first 3-way valve 530. The PCM heat sink 510 is arranged upstream to the battery rack 120, 121.

FIG. 11a shows a flow connection in PCM cooling charge mode, wherein the coolant is allowed to circulate through PCM heat sink 510 but not through the battery rack 120, 121. In the PCM cooling charge mode, a first 3-way valve 530 may be configured to allow the coolant to circulate through the PCM heat sink 510. A second 3-way valve 531 may be configured to prevent the coolant to circulate from the PCM heat sink 510 to the battery rack 120, 121. In this mode the effect is to charge the PCM heat sink 510 with "cooler" supply 112a with temperature t3 (e.g. about 5°–10° C.) thermal energy while cooling of battery racks 120, 121 is not needed. When in the PCM cooling charge mode, the coolant temperature will be very low, and the flow is controlled to flow between chiller 112 and the PCM heat sink 510 to accelerate the cooling charge speed. The flow is controlled by at least one of the valves 530, 531 to define the flow path being chiller-PCM-chiller. Thus, a first 3-way valve 530 is in ON mode to guide the flow from the chiller 112 to section a with temperature t3. A second 3-way valve 531 may be set to ON mode to prevent flow from the PCM heat sink 510 to flow through section b to section c. Chiller output flow 112a to the piping system 520 is colder than the chiller input flow 112b when returning back to the chiller 112.

FIG. 11a shows also a flow connection in battery cooling mode, wherein the coolant is allowed to circulate through the PCM heat sink 510 and through the battery rack 120, 121.

In this mode the effect is to cool supplied flow 112a with temperature t5 (e.g. around 15-25° C.) coolant using PCM heat sink 510 thermal energy before routing the PCM heat sink 510 cooled coolant flow to battery racks 120, 121. In the battery cooling mode, a first 3-way valve 530 is configured to allow the coolant to circulate to a second 3-way valve 531, and the second 3-way valve 531 is configured to allow the coolant to circulate through the PCM heat sink 510 and therefrom through the battery rack 120, 121. When in the battery cooling mode, the coolant temperature will e.g. be around 15-25° C., and controlled to flow into PCM heat sink 510 and to the battery rack 120, 121, to provide extra cooling capacity. The flow is controlled by the valves 530, 531 to define the flow path being chiller-PCM-battery rack-chiller. Thus, a first 3-way valve 530 is in OFF mode to guide the flow from the chiller 112 to a second valve 531. A second 3-way valve 531 is in ON mode to guide the flow from to section b with temperature t5. The flow then goes through the PCM heat sink 510 to the battery rack 120, 121 and back to chiller 112. Chiller input flow 112b is warmer when returning back to the chiller 112 than the flow entering the battery rack 120, 121.

Battery cooling mode may be used as a normal operating mode to maintain or adjust the battery rack 120, 121 temperature for optimum operating temperature with the aid of the PCM heat sink 510. Typically, in battery cooling mode heat is removed from battery modules/cells in the racks.

In an embodiment, the battery cooling mode may also be used for heating. In this mode the effect is to warm battery rack 120, 121 with "warmer" supply 112a (e.g. around 20-30° C.) thermal energy when the PCM heat sink 510 can utilize stored heat of the PCM heat sink due to warmer ambient temperature of the daytime. In this case no heater of the chiller 112 needs to be activated yet. This may be useful when ambient temperature rapidly decreases from daytime towards nighttime, for example. Thus, the chiller 112 may be merely used to enable coolant flowing through the flow path of chiller-PCM-battery-chiller.

For example, the battery finished one cycle in the daytime, and during the night, ambient temperature reduced a lot and the temperature of battery needs to be maintained. In this situation, the heater inside the chiller 112 needs not yet to be turned on but it is possible to use the heat stored in the PCM heat sink to warm up the battery. This may be a rare situation though since most of the time the PCM heat sink 510 is there to help the chiller 112 to remove heat from battery 120, 121. However, this Battery Warm up sub-mode may be useful when transitioning from battery cooling sub-mode to battery heating mode.

FIG. 11a shows also a flow connection in battery heating mode, wherein the coolant is not allowed to circulate through PCM heat sink 510 but allowed through the battery rack 120, 121.

In this mode the effect is to warm battery rack 120, 121 with "warmer" supply 112a (e.g. around 25-35° C.) thermal energy when PCM heat sink 510 related cooling of battery racks 120, 121 is not needed. This may be useful in colder environments, for example. When in battery heating mode, the coolant flow is controlled to flow battery rack(s) only, to warm up battery temperature for a better charge and discharge window. A first 3-way valve 530 and a second 3-way valve 531 may be configured to prevent the coolant to circulate through PCM heat sink 510 and the second 3-way valve 531 is further configured to allow the coolant to circulate through the battery rack 120, 121. In this situation, the heater inside the chiller 112 may typically be turned on. The flow is controlled by the valves 530, 531 to define the flow path being chiller-battery rack-chiller. Thus, a first 3-way valve 530 is in OFF mode to guide the flow from the chiller 112 to a second 3-way valve 531. The second 3-way valve 531 is in OFF mode to guide the flow to section c with temperature t6 (e.g. around 25-35° C.) and eventually to battery rack 120, 121 before returning back to the chiller 112. Chiller output flow 112a to the piping system 520 is warmer than the chiller input flow 112b when returning back to the chiller 112.

Battery heating mode is configured to add heat to battery rack 120, 121 and battery modules/cells in each rack.

In an embodiment, the battery heating mode may comprise a sub-mode called a circulation mode that is active in response to BM temperature comparison. Main difference between the circulation mode and the battery heating mode is that the heater of the chiller is turned on to a warmer temperature, e.g. 25-35° C. in heating mode but not in circulation mode. Thus both 3-way valve 1 is set to OFF position and 3-way valve 2 is set to OFF position.

Change between battery heating mode and circulation mode may be based on battery module (BM) temperature that is compared for example to t1 (e.g. t1=5° C.) and if the BM temperature is lower than t1, then heater of the chiller is switched on to supply coolant with set temperature t6, e.g. 25-35° C. Then again, if the BM temperature is higher than t1, then control mode is changed back to circulation mode.

FIG. 11b shows a schematic picture of an energy storage cooling system in accordance with an example embodiment for and energy storage module for a frequency regulation case. In an embodiment, an energy storage cooling system 1110 for an energy storage module comprises a PCM heat sink 510 comprising a heat exchanger 511; a piping system 520 for circulating a coolant between the heat exchanger 511 and a battery rack 120, 121 of the energy storage module; a valve system 530 comprising at least one 3-way valve 530 arranged upstream to the PCM heat sink 510 and to the battery rack 120, 121.

FIG. 11b shows also a flow connection in battery cooling mode, wherein the coolant is allowed to circulate through the PCM heat sink 510 and through the battery rack 120, 121.

In this mode the effect is to cool supplied flow 112a with temperature t5 (e.g. around 15-25° C.) coolant using PCM heat sink 510 thermal energy before routing the PCM heat sink 510 cooled coolant flow to battery racks 120, 121. When in the battery cooling mode, the coolant temperature will be around 15-25° C., and controlled to flow into PCM heat sink 510 and to the battery rack 120, 121, to provide extra cooling capacity. The flow is controlled by the valve 530 to define the flow path being chiller-PCM-battery rack-chiller. Thus, a first 3-way valve 530 is in ON mode to guide the flow from the chiller 112 to section b with temperature t5. The flow then goes through the PCM heat sink 510 to the battery rack 120, 121 and back to chiller 112. Chiller input flow 112b is warmer when returning back to the chiller 112 than the flow entering the battery rack 120, 121.

Battery cooling mode may be used as a normal operating mode to maintain or adjust the battery rack 120, 121 temperature for optimum operating temperature with the aid of the PCM heat sink 510. Typically, in battery cooling mode heat is removed from battery modules/cells in the racks.

In an embodiment, the battery cooling mode may also be used for heating. In this mode the effect is to warm battery rack 120, 121 with "warmer" supply 112a (e.g. around 25-35° C.) thermal energy when the PCM heat sink 510 can utilize stored heat of the PCM heat sink due to warmer ambient temperature of the daytime. In this case no heater of the chiller 112 needs to be activated yet. This may be useful when ambient temperature rapidly decreases from daytime towards nighttime, for example. Thus, the chiller 112 may be merely used to enable coolant flowing through the flow path of chiller-PCM-battery-chiller.

For example, the battery finished one cycle in the daytime, and during the night, ambient temperature reduced a lot and the temperature of battery needs to be maintained. In this situation, the heater inside the chiller 112 needs not yet to be turned on but it is possible to use the heat stored in the PCM heat sink to warm up the battery. This may be a rare situation though since most of the time the PCM heat sink 510 is there to help the chiller 112 to remove heat from battery 120, 121. However, this battery cooling sub-mode may be useful when transitioning from battery cooling mode to battery heating mode.

FIG. 11b shows also a flow connection in battery heating mode, wherein the coolant is not allowed to circulate through PCM heat sink 510 but allowed through the battery rack 120, 121.

In this mode the effect is to warm battery rack 120, 121 with "warmer" supply 112a (e.g. around 25-35° C.) thermal energy when PCM heat sink 510 related cooling of battery racks 120, 121 is not needed. This may be useful in colder environments, for example. When in battery heating mode, the coolant flow is controlled to flow battery rack(s) only, to warm up battery temperature for a better charge and discharge window. In this situation, the heater inside the chiller 112 is typically turned on. The flow is controlled by the valve 530 to define the flow path being chiller-battery rack-chiller. Thus, the 3-way valve 530 is in OFF mode to guide the flow from the chiller 112 to section c with temperature t6 (e.g. 25-35° C.) and eventually to battery rack 120, 121 before returning back to the chiller 112. Chiller output flow 112a to the piping system 520 is warmer than the chiller input flow 112b when returning back to the chiller 112.

Battery heating mode is configured to add heat to battery rack 120, 121 and battery modules/cells in each rack.

In an embodiment, in the PCM cooling charge mode, the chiller supply coolant having temperature in a range of 5-15° C.

In an embodiment, in the battery cooling mode, the chiller supply coolant having temperature in a range of 15-25° C.

In an embodiment, in the battery heating mode, the chiller supply coolant having temperature in a range of 25-35° C.

Without in anyway limiting the scope, interpretation, or application of the claims appearing below, a technical effect of one or more of the example embodiments disclosed herein is an improved energy storage module.

A technical effect of one or more of the example embodiments disclosed herein is that cooling of the energy storage module is improved. A further technical effect of one or more of the example embodiments disclosed herein is that extra cooling capacity is provided. A further technical effect of one or more of the example embodiments disclosed herein is that chiller work hours are shifted to optimal time to increase efficiency. A further technical effect of one or more of the example embodiments disclosed herein is that return coolant temperature is stabilized to reduce chiller power consumption. A further technical effect of one or more of the example embodiments disclosed herein is that battery modules are kept warm without using extra energy. A further technical effect of one or more of the example embodiments disclosed herein is that cascade explosion risk from container to container is minimized.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications that may be made without departing from the scope of the present invention as defined in the appended claims.

The invention claimed is:

1. An energy storage cooling system for an energy storage module, comprising:

a chiller for supplying a coolant;

a PCM heat sink comprising a heat exchanger;

a piping system for circulating the coolant between the chiller, the heat exchanger and a battery rack of the energy storage module;

a valve system comprising at least one 3-way valve arranged upstream to the PCM heat sink and to the battery rack; and a control unit configured to control the valve system in different operating modes comprising:

a battery cooling mode, wherein the coolant is allowed to circulate through the PCM heat sink and through the battery rack;

a battery heating mode, wherein the coolant is not allowed to circulate through the PCM heat sink but allowed to circulate through the battery rack; and a PCM cooling charge mode, wherein the coolant is allowed to circulate through the PCM heat sink but not allowed to circulate through the battery rack.

2. The system of claim 1, wherein in the PCM cooling charge mode, a first 3-way valve is configured to allow the coolant to circulate through the PCM heat sink.

3. The system of claim 1, wherein a second 3-way valve is configured to prevent the coolant to circulate from the PCM heat sink to the battery rack.

4. The system of claim 2, wherein in the PCM cooling charge mode, the chiller supply coolant having temperature in a range of 5-10° C.

5. The system of claim 1, wherein the energy storage module is configured to be used for at least one of: energy storage case and frequency regulation case.

6. The system of claim 5, wherein for the energy storage case the valve system comprising at least two 3-way valves.

7. The system of claim 5, wherein for the frequency regulation case the valve system comprising at least one 3-way valve.

8. The system of claim 1, wherein the PCM heat sink is arranged inside a housing of the energy storage module or external to the housing.

9. The system of claim 1, wherein a first 3-way valve of the valve system is arranged downstream to the chiller and upstream to the PCM heat sink.

10. The system of claim 1, wherein a second 3-way valve of the valve system is arranged downstream to a first 3-way valve.

11. The system of claim 1, wherein the PCM heat sink is arranged upstream to the battery rack.

12. The system of claim 1, wherein in the battery cooling mode, a first 3-way valve is configured to allow the coolant to circulate to a second 3-way valve, the second 3-way valve is configured to allow the coolant to circulate through the PCM heat sink and therefrom through the battery rack.

13. The system of claim 1, wherein in the battery heating mode, a first 3-way valve and a second 3-way valve are configured to prevent the coolant to circulate through PCM heat sink and the second 3-way valve is further configured to allow the coolant to circulate through the battery rack.

14. The system of claim 13, wherein the battery heating mode comprising a circulation mode as a sub-mode, wherein in the circulation mode a heater of the chiller is turned off or to a lower temperature compared to the heating mode.

15. The system of claim 1, wherein in the battery cooling mode, the chiller supply coolant having temperature in a range of 10-20° C.

16. The system of claim 1, wherein in the battery heating mode, the chiller supply coolant having temperature in a range of 20-35° C.

17. The system of claim 1, wherein the piping system is connected to the battery rack via connectors, wherein a battery module of the battery rack is placed on a cold plate and the cold plate is connected to the connectors.

18. The system of claim 1, wherein the connectors enable the coolant to flow into the cold plate under the battery module to add or remove heat based on the operating mode.

19. The system of claim 18, wherein battery modules with underlying cold plates are stacked vertically to the battery rack.

20. An energy storage module with an energy storage cooling system comprising:

a chiller for supplying a coolant;

a PCM heat sink comprising a heat exchanger;

a piping system for circulating the coolant between the chiller, the heat exchanger and a battery rack of the energy storage module;

a valve system comprising at least one 3-way valve arranged upstream to the PCM heat sink and to the battery rack; and a control unit configured to control the valve system in different operating modes comprising:

a battery cooling mode, wherein the coolant is allowed to circulate through the PCM heat sink and through the battery rack;

a battery heating mode, wherein the coolant is not allowed to circulate through the PCM heat sink but allowed to circulate through the battery rack; and a PCM cooling charge mode, wherein the coolant is allowed to circulate through the PCM heat sink but not allowed to circulate through the battery rack.

21. A computer implemented method for controlling an energy storage cooling system for an energy storage module comprising a chiller for supplying a coolant; a PCM heat sink comprising a heat exchanger; a piping system for circulating the coolant between the chiller, the heat exchanger and a battery rack of the energy storage module; and a valve system comprising at least one 3-way valve arranged upstream to the PCM heat sink and to the battery rack; the method comprising:

determining operating modes for controlling the 3-way valves;

controlling, in battery cooling mode, the coolant to circulate through the PCM heat sink and through the battery rack;

controlling, in a battery heating mode, the coolant to not circulate through the PCM heat sink but circulate through the battery rack; and controlling, in a PCM cooling charge mode, the coolant to circulate through the PCM heat sink but not circulate through the battery rack.

* * * * *